Sept. 30, 1947.   C. R. NICHOLS ET AL   2,428,034
ELECTRICAL PROSPECTING APPARATUS
Filed April 13, 1936   2 Sheets-Sheet 1
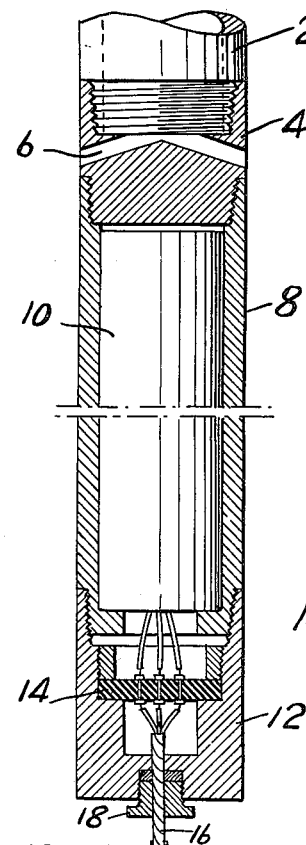
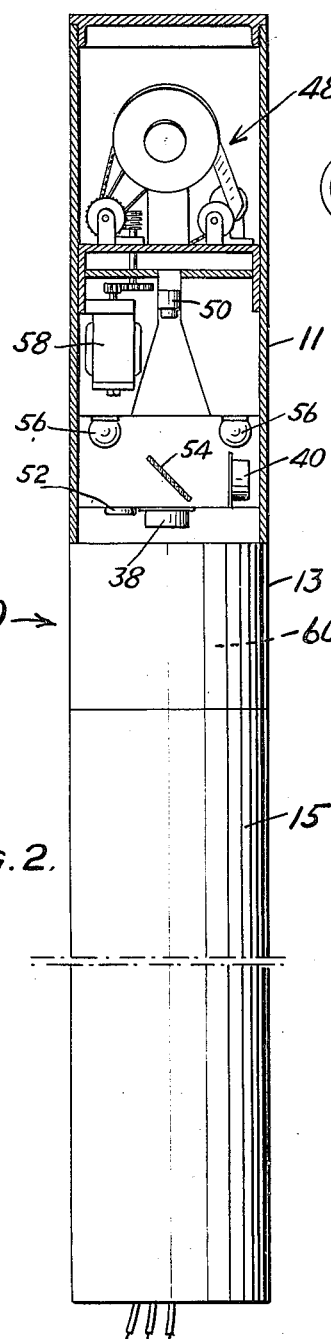
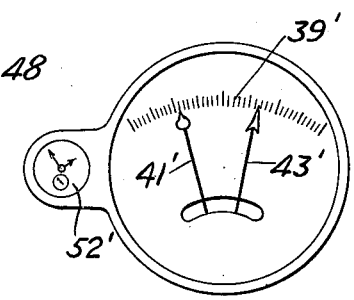
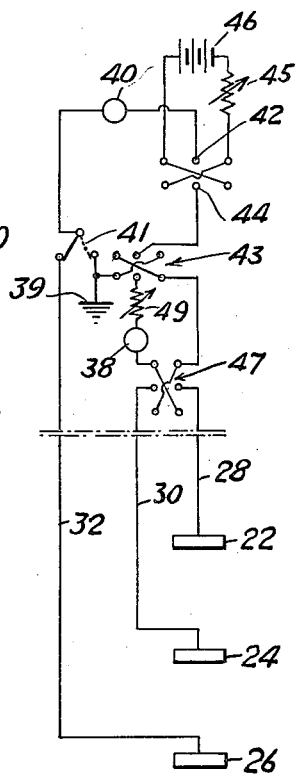
INVENTOR
Charles R. Nichols
Samuel H. Williston
BY
ATTORNEYS.

Patented Sept. 30, 1947

2,428,034

UNITED STATES PATENT OFFICE 2,428,034

ELECTRICAL PROSPECTING APPARATUS

Charles R. Nichols, McAllen, Tex., and Samuel H. Williston, Aberdeen, Wash., assignors to Sperry-Sun Well Surveying Company, Philadelphia, Pa., a corporation of Delaware Application April 13, 1936, Serial No. 73,982

1 Claim. (Cl. 175—182)

This invention relates to a method and apparatus for effecting determination of the nature of geological formations penetrated by bore holes. Specifically the present invention relates to a simultaneous determination of variations of resistivity at separating boundaries and permeability of formations at various depths. By simultaneous determinations of variations of resistivity and permeability, deductions may be made as to the character and content of the formations penetrated.

In an application filed by Pearson and Nichols on May 2, 1935, Ser. No. 19,434, issued on June 4, 1946, as Patent No. 2,401,371, there are described a method and apparatus of a preferred form accomplishing the results above indicated. The apparatus of said application is adapted to give results referred to a particular datum which is constant, this being accomplished by measuring direct and alternating components of a potential between an electrode within a bore hole and an electrode located at the surface effectively infinitely distant from the exploring electrode in the bore hole and electrodes which introduce current into the formations adjacent the bore hole. While an apparatus of such nature is highly desirable, it involves substantial complications both at the receiving end and in the connections between the surface and the subsurface electrodes.

For many purposes it is unnecessary to secure as accurate results as may be obtained by the apparatus and method to which reference has just been made. In many cases it is desirable merely to locate strata of high resistivity and substantial permeability which may be suspected to constitute an oil sand. Another object of the use of such apparatus is to map subsurface strata, which may be accomplished in limited regions by running apparatus of this nature into adjacent bore holes and noting occurrences of strata of particularly high or low resistivity or high or low permeability. By graphically plotting the results of such electrical logging, the depths of strata identifiable in all the bore holes may be determined for each hole and from this data the dip and strike of any particular formation may be calculated.

It is the object of the present invention to provide a method and apparatus of simple nature which, while it may not be expected to give consistently quite accurate indications of specific resistivity or permeability, will nevertheless in general give indications of the presence of formations having unusual characteristics of resistivity or permeability and which may accordingly be used for qualitative or approximate quantitative determinations of the types indicated above. The method and apparatus forming the subject of this invention are very simple. The apparatus does not require any surface connection and may be lowered either on a wire line or on a drill stem. The apparatus, in its preferred form, comprises an assembly including electrodes, a source of current to be supplied through two of the electrodes to the earth, and apparatus for automatically recording the readings of electrical instruments as the apparatus is lowered into a bore hole. Preferably the apparatus is kept in operation not only during the lowering but also during the raising operations and consequently a check upon the indications is obtained. In its preferred embodiment the apparatus involved is of the simplest nature consistent with the securing of complete satisfactory results, although it will be understood that refinements of apparatus may be introduced though this is to a considerable extent limited by the fact that the entire apparatus must be located in a casing capable of passing through a bore hole of relatively small size. It is also possible to use simpler apparatus in accordance with the invention when, for example, a drill bit is used as an electrode.

The invention also relates generally to the recording in the bore hole of indications of apparatus responsive to variations of the nature of strata penetrated by the bore hole.

The various subsidiary objects of the invention, particularly relating to details of construction and operation, will be apparent from the following description read in conjunction with the accompanying drawing, in which:

Fig. 1 is a vertical section through an electrode assembly and recording apparatus;

Fig. 2 is an elevation partly in section showing certain elements of the recording apparatus;

Fig. 3 is a view illustrating the type of photographic record made during the operation of the apparatus;

Fig. 4 is a wiring diagram showing the electrical connections involved;

Figure 5:
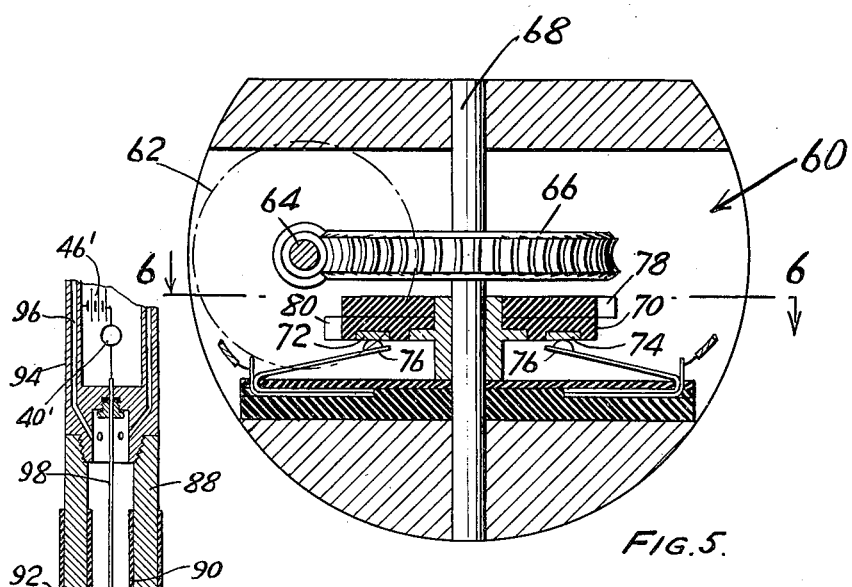
Fig. 5 is a transverse section showing certain timing elements used for control of the recording means.

Referring first to the preferred embodiment of the invention, logging apparatus may be lowered into the bore hole by means of a wire line or by means of a drill stem such as indicated at 2 in Fig. 1, the drill stem being connected, through a suitable coupling member provided with mud circulating holes 6, with the upper end of a protective casing 8 designed to withstand the high pressures encountered in a deep hole which contains mud. Within the protective casing 8 there is located an inner instrument casing, indicated generally at 10, this casing comprising a plurality of sections including, for example, an upper section 11 containing photographic recording apparatus; an intermediate section 13 containing certain timing apparatus shown more particularly in Figs. 5 and 6, and a lower section 15 containing batteries which serve to supply current to the earth and which also supply current for illumination and for motors driving the camera and timing mechanism. The lower end of the protective casing is closed by a suitable cap, indicated at 12, and arranged to provide electrical connection between the recording apparatus and a cable extending downwardly from the protective casing, such connections being indicated at 14. The cable 16, which is preferably of armored type, passes into the protective casing 12 through a stuffing box 18 conventionally illustrated in Fig. 1 but which should be of a type capable of withstanding the high pressures encountered in a bore hole. Such stuffing boxes are known and need not be described herein in detail.

The armored cable 16 contains three conductors 28, 30, 32 connected to electrodes 22, 24 and 26, which preferably take the form of metallic rings carried by the insulated housing 20 of the electrode assembly, the interior of which may be filled with lead, as indicated at 34, so as not only to weight it but also to hold the cable 16 in a secure fashion. As indicated by the broken lines in Fig. 1, the electrodes 22, 24 and 26 may be spaced in any desired fashion, either closely or far apart, depending upon the results which it is desirable to secure. If location of strata of little thickness is desired, then the electrodes must be fairly closely spaced, though their spacing should exceed several times the diameter of the bore hole in order that the mud in the hole may not, in effect, short circuit them to such extent as to make the effects of surrounding strata undetectable.

In the present instance the protective casing 8, together with its supporting wire line or drill stem, forms a fourth electrode which may serve either as a reference electrode, in which case it should be remote from the electrodes 22, 24 and 26 so as to influence to a minimum degree the readings obtained, or as a current electrode, in fashions referred to hereafter. The armored cable 16 ordinarily has a metallic cover and in order to prevent it from acting as part of the reference electrode it is desirable to cover it with insulation, as indicated at 36, extending from the insulation 20 and continuous therewith, without any break through which leakage might occur, up the cable 16 to a sufficient distance so that any metallic parts connected with the casing 8 are spaced a considerable distance from the three ring electrodes. It will be obvious, of course, that the electrode arrangement need not be that illustrated. The electrodes may take various forms and, furthermore, if lowering upon a wire line is effected, the instrument casing 8 itself may be insulated and carry the electrodes suitably insulated from each other and a suitably spaced fourth electrode may be located either above or below the casing, connected to the apparatus in the proper fashion through an exteriorly insulated wire. Any such arrangements are satisfactory provided that the necessary spacing and insulation is provided to secure the desired electrical configuration.

In Fig. 4 there is shown an electrical circuit including a number of switches which make it possible to use various electrode combinations. A battery 46, which is desirably of a storage type so as to supply relatively heavy currents for long periods without substantial decrease in its terminal potential, is connected through a resistance 45 to a reversing switch, which is indicated diagrammatically at 42—44, this switch being preferably a rotary one, illustrated in greater detail in Figs. 5 and 6. If switch 41 is thrown to its left-hand position and the double pole, double throw switch 43 is also in its left-hand position, the battery furnishes current through an ammeter 40, the wire 32 and the electrode 26, and may, through the reversing switch 47, be connected to either electrode 22 or 24 to complete the current circuit. If the reversing switch 47 is in such position as to make electrode 22 a current electrode, then 24 becomes a potential electrode connected through galvanometer 38 to the casing, which is indicated at 39 as a ground. This casing is, of course, actually an electrode and with the circuit arrangement just indicated forms a reference datum for the potential. It may be remarked that the galvanometer 38 should be of high resistance relative to other resistances in the circuit so as to draw a minimum of current, since, as the drain of current through the electrode 24 increases, the results would become increasingly uninformative without the application of special corrections based on the known electrical constants of the circuit. The galvanometer 38 is provided with a multiplying resistance 49 which may be so adjusted as to conform with the particular configuration used, since some configurations will require a sensitive galvanometer and others an insensitive one which will not be injured by comparatively heavy currents.

If the reversing switch 47 is thrown to its alternative position, then the electrode 22 becomes the exploratory or potential electrode and electrode 24 becomes a current electrode. Again, the casing acts as the datum electrode.

If the switch 41 is thrown to the right-hand position indicated in Fig. 4, while switch 43 remains in its previous left-hand position, then the instrument casing 8 becomes a current electrode and at the same time becomes the datum of reference for the potential of either electrode 22 or 24, which may be chosen as the exploratory electrode depending upon the position of the switch 47. In this case it is essential that the galvanometer be adequately protected by the multiplying resistance 49.

Still another configuration is obtained by having switch 41 in its left-hand position and switch 43 in its right hand position. The casing and electrode 26 then become the current electrodes and 22 and 24 become the reference electrodes.

The two galvanometers 38 and 40 are arranged to be photographed simultaneously by means of a camera, indicated generally at 48, provided with a lens 50 arranged to project images of the instruments upon a motion picture film which is fed through the camera by a motor 58. A suitable arrangement of the instruments is indicated in Fig. 2. The galvanometers 38 and 40 may be located as shown. A half-silvered mirror 54 arranged at an angle as indicated permits the galvanometer 38 to be directly photographed and the galvanometer 40 to be photographed by reflection so as to produce a superimposed image of the two. A timepiece 52 in the form of a watch is photographed simultaneously with the galvanometers at 52'. All of the instruments are illuminated by lamps 56. The camera may be provided either with a shutter, in which case the lamps may be continuously illuminated, or preferably no shutter need be used, the lamps 56 being intermittently illuminated whenever the exposure is to be made, these exposures being made during periods of rest of the film.

It is convenient to superpose the images of the galvanometers 38 and 40 to facilitate reading. For such purpose, only one of them need be provided with a scale, the needle of the other one being photographed in such fashion as to appear superimposed upon the scale of the other. The resulting record, for example, may be as indicated in Fig. 3. The scale the record of which is shown at 39', for example, may be on the galvanometer 38, which may be provided with a needle the image of which is shown at 41'. The needle, pictured at 43', of the galvanometer 40 may then be read against said scale. The correlations of these readings will be described hereafter.

Figures 6, 7:
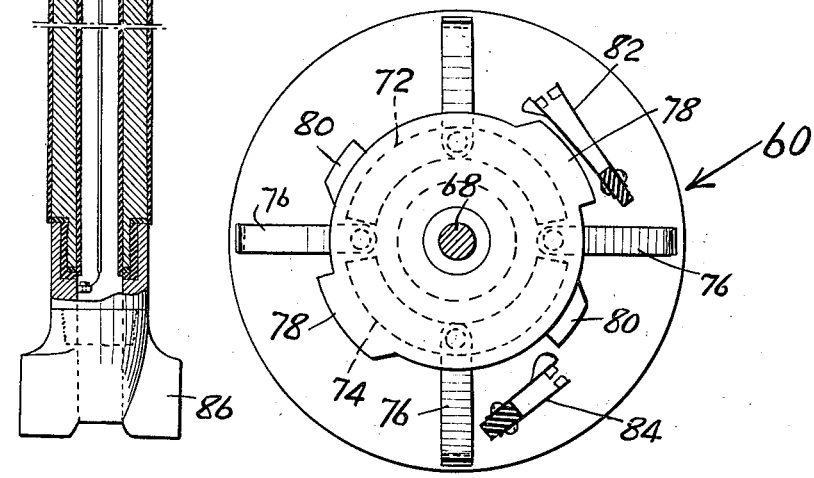
Fig. 6 is a section taken on the plane indicated at 6—6 in Fig. 5.
Fig. 7 is a diagrammatic sectional view showing an application of the invention with the use of a drill bit as an electrode.

The apparatus is designed to be lowered slowly within a bore hole while the recording apparatus produces numerous successive exposures which are desirably made with sufficient frequencies to insure that at least two occur while the electrodes are passing through any particular strata as to which information is desired. For this purpose controlling apparatus indicated in Figs. 5 and 6 is provided.

This controlling apparatus comprises a motor 62 driving a vertical shaft 64 which, through a worm and wheel arrangement indicated at 66, drives, at a lower rotary speed, a transverse shaft 68 which carries a switch and cam arrangement indicated at 70. Conducting segments 72 and 74, each having an extent slightly less than a semicircle, make electrical engagement with four contact members 76 spaced ninety degrees from each other, as indicated in Fig. 6. By connecting two opposite members 76 to the battery 46 and the two others to the meter 40 and switch 43 respectively, it will be seen that there is provided the reversing switch mentioned above and indicated diagrammatically at 42—44. An element having cams 78 is arranged to close a switch 82, which is connected in the circuit of lamps 56 so that the lamps are periodically illuminated for a period corresponding to the angular extent of the cams 78. Other cams 80 are provided as indicated to effect closure of a switch 84, which is arranged in the energized circuit of motor 58 so as to drive the latter intermittently to feed the film to such extent as to cause fresh portions to come in the field of the lens 50 every time the switch 84 is closed. It may be remarked, as indicated in Fig. 6, that the switches 82 and 84 are never closed simultaneously, with the result that exposures are made only when the film is stationary. It may also be noted that the switch 82 is not closed until after electrical connections between contacts 76 have been completed for a short period, so that the instrument needles are at rest when the exposure is made and a sharp image is thereby produced.

As was briefly indicated above in connection with the description of Fig. 4, numerous electrode configurations are possible which will give results of types known in the prior art. Possibly the most important and informative arrangement is that which gives potential center displacement indications and which, in the present apparatus, will also indicate spontaneously generated potentials which may occur due to electro-filtration, electrolysis, or other causes. In order to minimize electrolytic effects due to the apparatus itself, it is desirable that the electrodes 22, 24 and 26 should be of similar materials and that the casing 8 and the metallic parts should be of the same material. This, of course, from a practical consideration, requires that the electrodes should be of steel. However, different materials may be used if caution is exercised in the interpretation of the results.

The configuration to which reference has just been made would involve the location of switch 41 in its left-hand position and the arrangement of reversing switch 47 in its upper position, so that electrodes 22 and 26 become current electrodes and 24 is a potential electrode which, in this instance, is preferably equidistantly located between the electrodes 22 and 26. The casing 8 and drill stem or wire line which supports it then become the reference electrode, which should be located a substantial distance from the other electrodes, this distance being preferably of the order of seven or more times the spacing of electrodes 22 and 26. The spacing of the latter electrodes depends entirely on the minimum thickness of the formations which are to be detected. As previously remarked, the minimum spacing is that which would permit the diameter of the bore hole to have a substantial effect in minimizing or masking the effects due to varying formations.

The electrical considerations involved in this configuration need not be considered in detail, since they are similar to those involved in the method described in the patent to Nichols and Williston, No. 1,841,376, dated January 19, 1932, the interpretation being, of course, made with due regard to the fact that the electrodes are located within a bore hole rather than at the surface.

In carrying out this process, the apparatus is slowly lowered into the bore hole, being preferably stopped for short times at regular depth intervals, the time of attainment of which is noted at the surface on a watch synchronized with the watch 52, which is photographed automatically. By comparing the times recorded on the film with the times at which various depths are reached as noted at the surface, it is possible to correlate the electrical instrument readings with the depths at which they were made. It is thereby possible to provide a graphical indication of the variations of the instrument readings with the depth. This arrangement avoids any necessity for surface control of the recording and is particularly useful in connection with lowering of the apparatus on a drill stem when electrical connection to the surface is entirely impractical.

A cycle of operation is repeated time after time, and involves successively movement of the film to locate an unexposed portion in the field of the lens 50, attainment of a particular condition of the reversing switch, for example to make the current electrode 22 positive, a slight delay sufficient to permit the needles of instruments 38 and 40 to reach a stationary condition, and the illumination of the bulbs 56 for a sufficient time to produce an exposure. Thereafter the film is again moved, the polarity of the current electrodes reversed, and another exposure made.

Desirably the apparatus is left in any particular position long enough to secure two readings with reversed polarities of the current electrodes. For any two such readings taken in the same place, the needle of the ammeter 40 should obviously swing equidistantly on both sides of the zero. If it does not do so in a fixed location, that fact would be indicative of improper operation. Assuming that it has done so, the needle of the galvanometer may do several things. First, it may remain at zero in both cases. This would indicate that an electrically homogeneous formation surrounded the electrodes and also that there was no current in the vicinity of the electrodes due to spontaneously generated potentials. Alternatively, the galvanometer needle might swing equidistantly on both sides of the zero. This would indicate an electrical discontinuity in the formations surrounding the three electrodes which could be interpreted in the fashion indicated in the Nichols and Williston patent referred to above. A third condition might involve the location of the galvanometer needle in both instances in the same position at one side of zero. This would indicate a homogeneous formation in the vicinity of the electrodes but some current flow of spontaneous type which would produce a difference of potential between the exploratory electrode 24 and the reference electrode, which, in this case, would be the protective instrument casing. The fourth alternative condition would arise in the case of a discontinuity and also the presence of currents due to spontaneous causes. The two may be readily separated by reason of the reversal of the current flow, since the displacement of the center of swing of the galvanometer needle from the zero position could be ascribed to the spontaneously generated currents and the swing on either side of this midpoint would correspond to the discontinuity. It will be seen, therefore, that the reversal provides for a ready differentiation of the two causes of displacement of the galvanometer needle.

A third element entering into consideration and which would, in most cases, be indicated, comprises stray currents in the earth due to magnetic disturbances or artificial causes such as electrical railways or power systems, or the like. Such effects are frequently variable and if the exposures are of sufficient length they may be indicated by blurring of the photographic images of the galvanometer needle or by a failure of the records made during descent and ascent of the apparatus to check each other. Experienced observers, of course, have no difficulty in weighting the validity of the results which are recorded.

The indications of the ammeter 40 are not solely of value in showing improper operation, but, as a matter of fact, yield valuable information considered alone. In fact, in a simplified form of the apparatus (hereafter mentioned) the exploratory electrode might be omitted altogether, there being used only a current source of substantially constant electromotive force in series with the ammeter 40 with or without a reversing switch such as 42. If the current electrodes, for example, 22 and 26, are located in a formation of low resistivity, then the current will be high, whereas if they are located in a formation of high resistivity, the current for the same E. M. F. will be low. In this case, the resistance 45 should be small and the E. M. F. also comparatively low. The ammeter readings will then be very substantially affected by conditions about the electrodes. If there is used a source of current such as a storage battery which during a run may be assumed to maintain substantially the same E. M. F., it will be seen that the readings of the ammeter 40 will be quite significant. The maintenance of the same E. M. F. may, of course, be checked by measurements of the battery made at the surface before and after a run.

The above will indicate the nature of the results which may be expected if the reversing switch 47 is thrown to its alternative position to make 22 the exploratory electrode and 24 and 26 the current electrodes. In this case symmetry is no longer to be expected, and calculations will be necessary to evaluate the results. However, knowing the current and the value of the potential (calculated from the galvanometer readings and the constants of the circuit), and also knowing the spacing of the electrodes, approximate calculations of the specific resistivity of the formations encountered may be made.

Similar calculations of resistivity may also be made by the use of the alternative position of switch 41. In such case the electrode 26 is out of the circuit and the instrument casing 8 becomes a current electrode located, for all practical purposes, at infinity with respect to the other current electrode 22 or 24, depending upon the position of switch 47, and at the same time the casing becomes the reference datum for the exploratory electrode. It may be pointed out that the casing 8, which is of substantial length so as to probably span several different formations, satisfies the condition for an electrode at infinity in being substantially unaffected by local conditions. This, of course, is particularly true if the casing is carried by a conducting cable or a drill stem, in either of which cases the combination current and reference electrode which it constitutes will be very large and have a negligible resistance relative to the earth even though there may be locally adjacent the casing formations of high resistivity. In this last mentioned arrangement the multiplier 49 should be used to produce suitable high reading conditions of meter 38 since the potential gradient will generally be large.

Another configuration mentioned above involves the use of the casing and electrode 26 as current electrodes and 22 and 24 as reference electrodes. The reference electrodes will then measure the potential gradient between their positions which will vary depending upon the nature of surrounding strata.

It is also possible to utilize arrangements of electrodes such as those disclosed in Nichols and Williston Patent 1,841,976, dated January 19, 1932, a circuit similar to that of the patent being used which may be balanced for average conditions, there being recorded the readings of one or a plurality of meters in the circuit depending upon the object of the exploration; i. e., one instrument alone may be used when the object is merely to locate boundaries, while additional ones may be used when more nearly quantitative results are required.

The use of the casing as a current electrode may be joined with omission of the exploratory electrode entirely, and measurements may be made solely of the current indications of the ammeter 40 when the potential source is substantially constant. The variable resistance introduced into the circuit is then substantially solely due to the resistivity of the formation about the small current electrode 22 or 24, since the extent of the current electrode consisting of the casing 8 and its supporting means makes its resistance to earth negligible.

A particularly useful application of the method mentioned in the last paragraph involves the use of a drill bit as one of the current electrodes. An apparatus for this purpose is indicated in Fig. 7. The drill bit 86 is carried at the lower end of a section of drill stem, indicated at 88, which is insulated from it (being connected through an insulating insert as indicated), this section of drill stem being internally and externally insulated from the mud by insulating coverings 90 and 92. The insulated section should be of substantial length of the order of, say, five feet or more. The upper end of this drill stem section may be connected directly to the instrument casing 94, which, since drilling is being done, should be provided with suitable circulating mud passages, indicated at 96. Electrical connection between the drill bit and the ammeter 40' corresponding to 40 is accomplished through an insulated cable 98. The ammeter 40' may be connected to one pole of a battery 46' capable of maintaining a substantially constant voltage, the other pole of which battery is grounded. The recording apparatus in this case may be identical with that shown in Fig. 2, a reversing switch of the type indicated being preferably used. However, only the single ammeter 40' need be photographed, together with a watch. In the use of this apparatus, since the vertical progress is slow, it is desirable to take photographs only at considerable intervals, since otherwise much duplication will occur. The operation of the camera to take photographs at such intervals may be effected through the control of motor 62 by timing mechanism such as is illustrated in the patent to Kothny No. 2,012,456, dated August 27, 1935. Preferably in such case there is interposed an auxiliary switch preventing current from flowing into the earth except at such times as a reading may be made.

The operation is as indicated above. The drill bit provides an electrode of limited extent just as in the previous modification, while the instrument casing and drill stem above the insulation 90, 92 provide the reference electrode of infinite extent. By the use of this apparatus, which may be opened each time the drill bit is changed, a continuous check on the formations encountered during the drilling may be obtained without the necessity for any interruption of the drilling to make readings through the use of a separate instrument. Furthermore there are avoided the complications which arise in making an insulated connection to the surface.

It may be noted that protective resistances should be used in the battery circuits and meter circuits to avoid damaging short circuits or excessive currents through the meters while the apparatus is passing through a casing en route to or from the open portion of a hole. Such resistances will, in general, be provided in any event, for example, in Fig. 4, the resistance 45 may be from the order of an electrode to earth resistance to many times that value. In Fig. 7 the meter 40' may be of a comparatively high resistance type or there may be provided a suitable series resistance to limit a short circuit current.

The invention is disclosed herein, so far as the recording mechanism is concerned, in an extremely simple form. It will be obvious, however, that more elaborate recording mechanism may be used involving, for example, the use of an automatic potentiometer in place of the galvanometer 38 so that no current will be drawn when a record is made, thus eliminating any disturbances due to current flow into or out of the exploratory electrode. However, if a galvanometer is used having a resistance which is high compared to the exploratory electrode-ground resistance, the disturbing effects of the drawn current are negligible. Refinements may also be introduced giving indications of local electrode conditions. However, for the purpose of locating high resistance strata or of determining through the logging of several holes sufficient data to produce subsurface maps showing the dip and strike of formations, the apparatus disclosed herein is sufficiently accurate.

What we claim and desire to protect by Letters Patent is:

In combination, a drill stem, an electrode mechanically connected to one end of said stem but insulated therefrom, and a source of electrical energy at said end of said drill stem having one terminal electrically connected to said drill stem and the other terminal electrically connected to said electrode.

CHARLES R. NICHOLS.
SAMUEL H. WILLISTON.

REFERENCES CITED

The following references are of record in the file of this patent:

UNITED STATES PATENTS

| Number | Name | Date |
|---|---|---|
| 1,819,923 | Schlumberger | Aug. 18, 1931 |
| 1,960,038 | Williston et al. | May 22, 1934 |
| 2,018,080 | Martienssen | Oct. 22, 1935 |
| 2,037,306 | Blau et al. | Apr. 14, 1936 |
| 2,038,046 | Jakosky | Apr. 21, 1936 |
| 1,786,196 | Ennis | Dec. 23, 1930 |
| 1,925,223 | Ahlburg | Sept. 5, 1933 |
| 1,720,325 | Hackstaff et al. | July 9, 1929 |
| 1,894,328 | Schlumberger | Jan. 17, 1933 |
| 1,913,293 | Schlumberger | June 6, 1933 |
| 2,317,304 | Schlumberger | Apr. 20, 1943 |
| 2,046,436 | Wascheck | July 7, 1936 |
| 1,826,961 | Schlicter | Oct. 13, 1931 |
| 1,841,376 | Nichols et al. | Jan. 19, 1932 |